United States Patent
Willems et al.

[15] 3,693,216
[45] Sept. 26, 1972

[54] ANIMAL SHACKLING DEVICE

[72] Inventors: Donald J. Willems, Woodbridge, Ill. 60515; Everett F. Markey, Omaha, Nebr. 68104

[73] Assignee: Armour and Company, Chicago, Ill.

[22] Filed: April 13, 1971

[21] Appl. No.: 133,673

[52] U.S. Cl..................17/24, 17/1 A, 198/165
[51] Int. Cl. .................................................A22b 5/02
[58] Field of Search....17/1 A, 24, 44, 44.2; 119/127, 119/128; 198/165

[56] References Cited

UNITED STATES PATENTS

| 252,112 | 1/1882 | Lowry et al.............17/24 X |
| 898,209 | 9/1908 | Foster.....................17/24 |
| 976,316 | 11/1910 | Thomson...................294/74 |
| 2,513,877 | 7/1950 | Kahn.........................17/24 |
| 3,599,276 | 8/1971 | Edwards....................17/1 A |

*Primary Examiner*—Lucie H. Laudenslager
*Attorney*—Carl C. Batz

[57] ABSTRACT

A tension adjusting device, alongside a conveyor frame, which provides a meat animal passage, and alongside a shackle-equipped animal transportation track, is supported inwardly of the shackle chain for movement up and down or toward and away from the passage so as to yield when the shackle is applied to an animal's leg and then to swing outwardly and/or down to maintain tension upon the attached shackle as the animal moves through the passage.

10 Claims, 6 Drawing Figures

PATENTED SEP 26 1972

INVENTORS:
DONALD J. WILLEMS
EVERETT F. MARKEY

BY: *Carl C. Batz*

ATT'Y

INVENTORS:
DONALD J. WILLEMS
EVERETT F. MARKEY
BY: Carl C. Batz
ATT'Y

INVENTORS
DONALD J. WILLEMS
EVERETT F. MARKEY
BY: *Carl C. Batz*
ATT'Y

ANIMAL SHACKLING DEVICE

BACKGROUND AND SUMMARY

In the practice of shackling meat animals, a transportation track is provided alongside as animal passage with depending shackles which are secured about the leg of a stunned animal so that it may be transported through successive processing steps. After stunning, many animals continue to demonstrate rather violent kicking movements. These violent movements tend to loosen the shackle chain and sometimes release the attachment, and the operator is obliged to hold onto the shackle chain until the animal is moved to a vertical position. This greatly delays the operation in the shackling operation.

We have discovered that the operator can safely and more efficiently perform his duties if a means is provided to maintain tension on the attached shackle. To perform this function, a bar, belt, or some similar means is provided that swings or springs inwardly, downwardly or brakes the shackle to allow the shackled leg to move but still retain a degree of tautness on the shackle. This eliminates the need for an operator to retain a hold on the shackle chain (to prevent unshackling) until the animal is moved to the vertical position. The weight of the slide bar itself may be sufficient to place the necessary tension upon the chain when it swings downwardly or away from the passage after the attachment step or, if desired, positive spring or hydraulic or air piston means may be provided for moving the bar and shackle chain outwardly and/or downwardly after attachment.

DRAWINGS

In the accompanying drawings,

FIG. 1 is a top plan view of a restraining conveyor means which may be employed in providing the animal passage;

FIG. 2, a side elevational view of apparatus shown equipped with slide bars employed in the practice of our invention;

FIG. 3, a broken front view in elevation showing means for applying tension to the chain by means of a spring-urged slide bar;

FIG. 4, an enlarged detailed view illustrating the structure shown in FIG. 3;

FIG. 5, a view similar to FIG. 4 but showing a pivotally-mounted slide bar forming another embodiment of the invention; and FIG. 6, an enlarged broken side view in elevation showing the operator in the process of attaching the chain and the tensioner in position for taking up the slack and maintaining the shackle chain taut.

DETAILED DESCRIPTION

Figure 1:
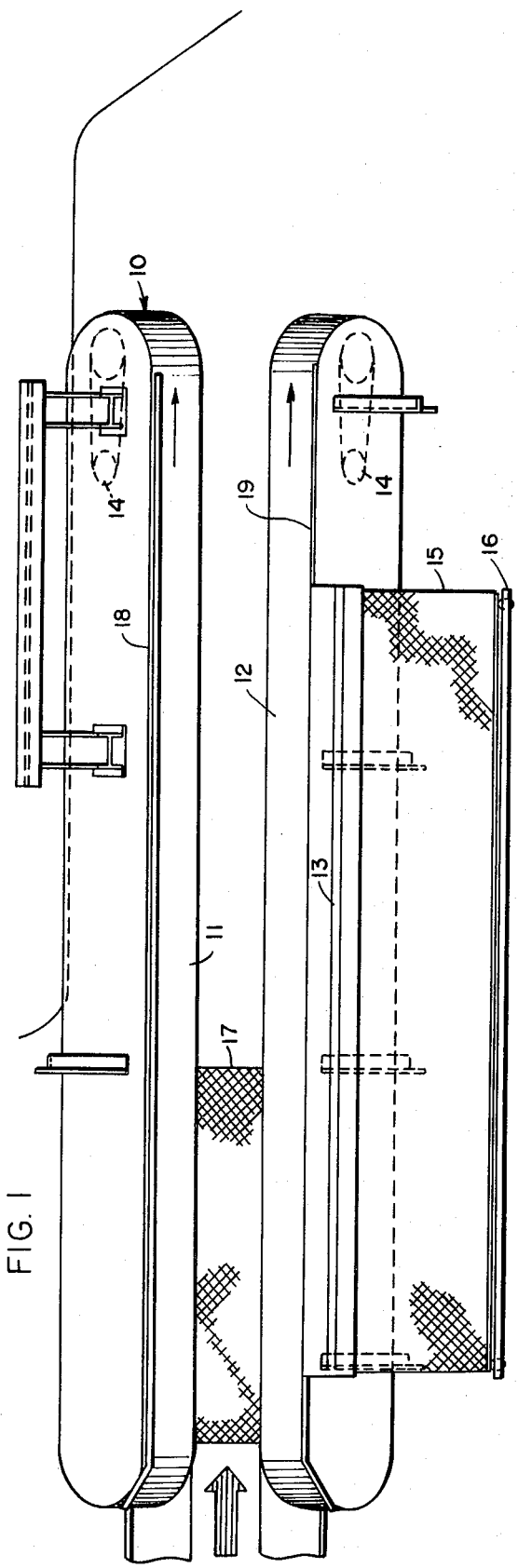

In the drawings, 10 designates a restraining pen forming an animal passage. The restrainer or restraining pen illustrated generally comprises conveyors 11 and 12 and support means 13 therefor.

The conveyors 11 and 12 are arranged in parallel spaced-apart relationship, each conveyor sloping downwardly and inwardly to form an open V. The distance between the conveyors may be adjusted by means not shown to support animals of different sizes when they are stunned and shackled, allowing the feet of the animal to hang freely below the conveyors. The conveyors may be driven by conventional power and gearing means as shown in the mechanical arts, such means being indicated by the numeral 14.

Along the conveyor 12 there is provided a platform or walk 15 for use by the stunning operator and a railing 16 extending along the walk.

An animal walk 17, as shown best in FIG. 1, permits the animal to walk part way through the animal passage, and then as the floor 17 terminates the animal is carried by the conveyors 11 and 12 with his feet extending below the conveyors, as shown best in FIG. 3. The members 18 and 19 tend to restrain lateral movements of the animal's head.

In the practice of the invention, we provide a track 20 which extends alongside the conveyors and adjacent to the V-opening between the conveyors. Upon the track is mounted a trolley 21 or a slide hook or captive shackle from which a vertical chain 22 depends, the chain being provided at its end with a hook 23 or loop, snare, or the like.

Figure 3:
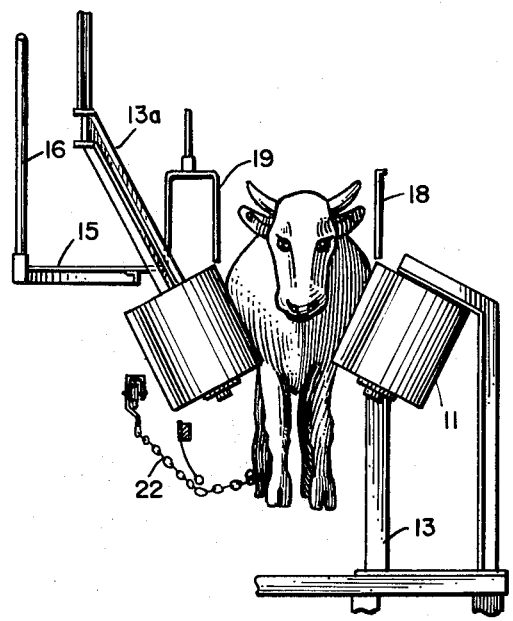
Figure 4:
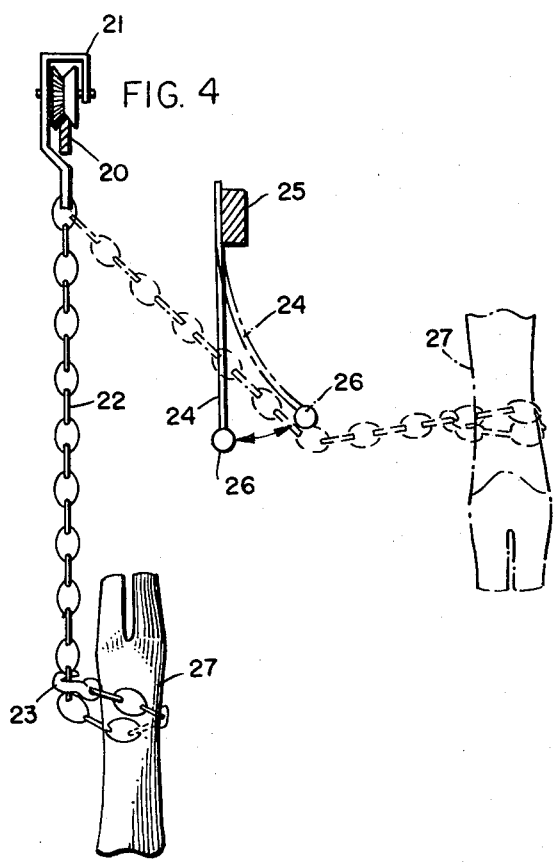

In the structure shown in FIGS. 3 and 4, a spring 24 is secured at its upper end to a frame member 25 and at its lower end to the slide bar or tensioner 26. When the slide bar 26 is engaged by the chain 22 after the chain has been attached to the animal's leg 27, as indicated in dotted lines in FIG. 4, the spring is tensioned and maintains the chain 22 taut. The frame member 25 is a part of the support frame 13 which is suspended on the left side by suspension structure 13a, as shown in FIG. 3.

Figure 5:
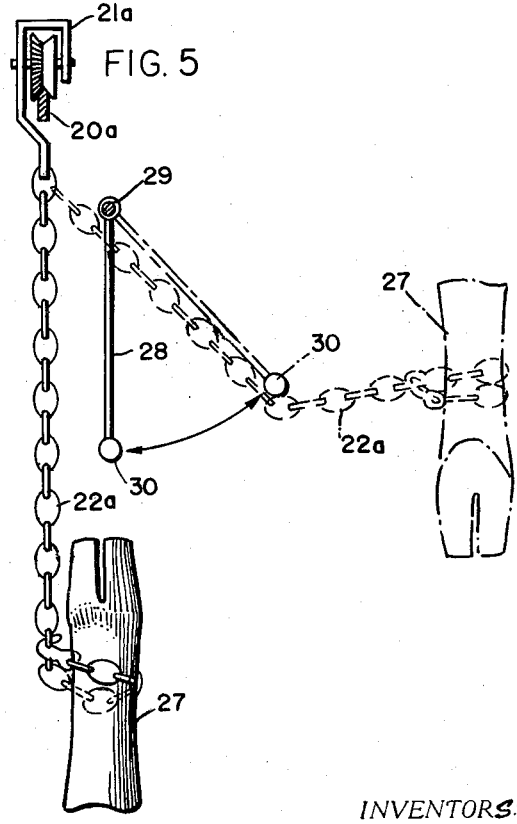

In the modification shown in FIG. 5, the blade OR strap 28 is pivotally mounted upon a pivot 29 carried by a frame portion 13, and the weight of the slide bar 30 carried by the strap 28 is sufficient to maintain tension upon the chain 22a after attachment to the animal's leg. If desired, the member 29 may be mounted upon the belt frame or any other support structure.

Figure 6:
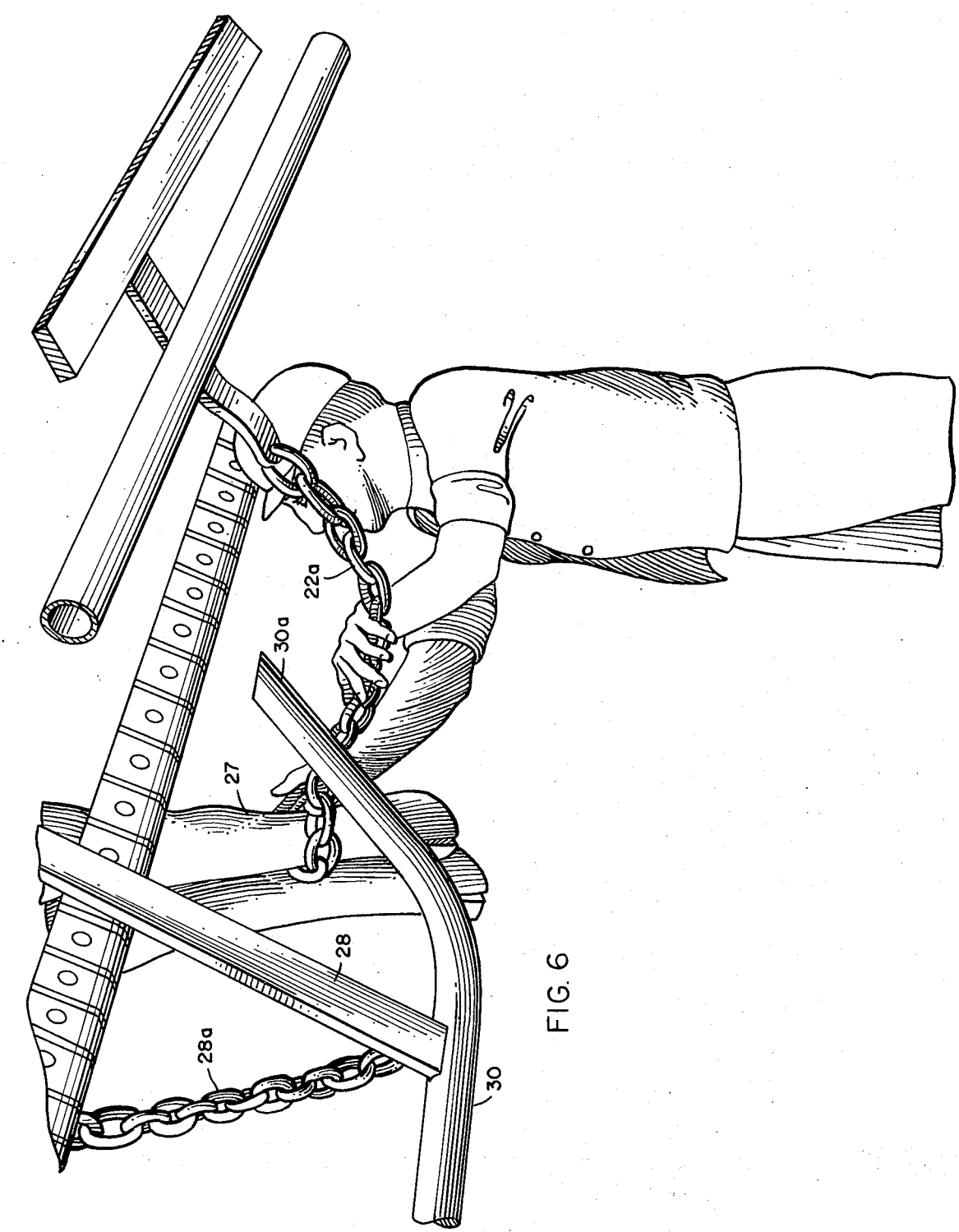

The operation of attachment is best shown in FIG. 6. The operator moves the chain 22a inwardly and secures the same about a rear leg 27 of the animal, and the chain 22a immediately engages the forward curved end 30a of the slide bar 30, thus drawing the chain taut and maintaining it under tension as the animal moves forward through the passage.

Figure 2:
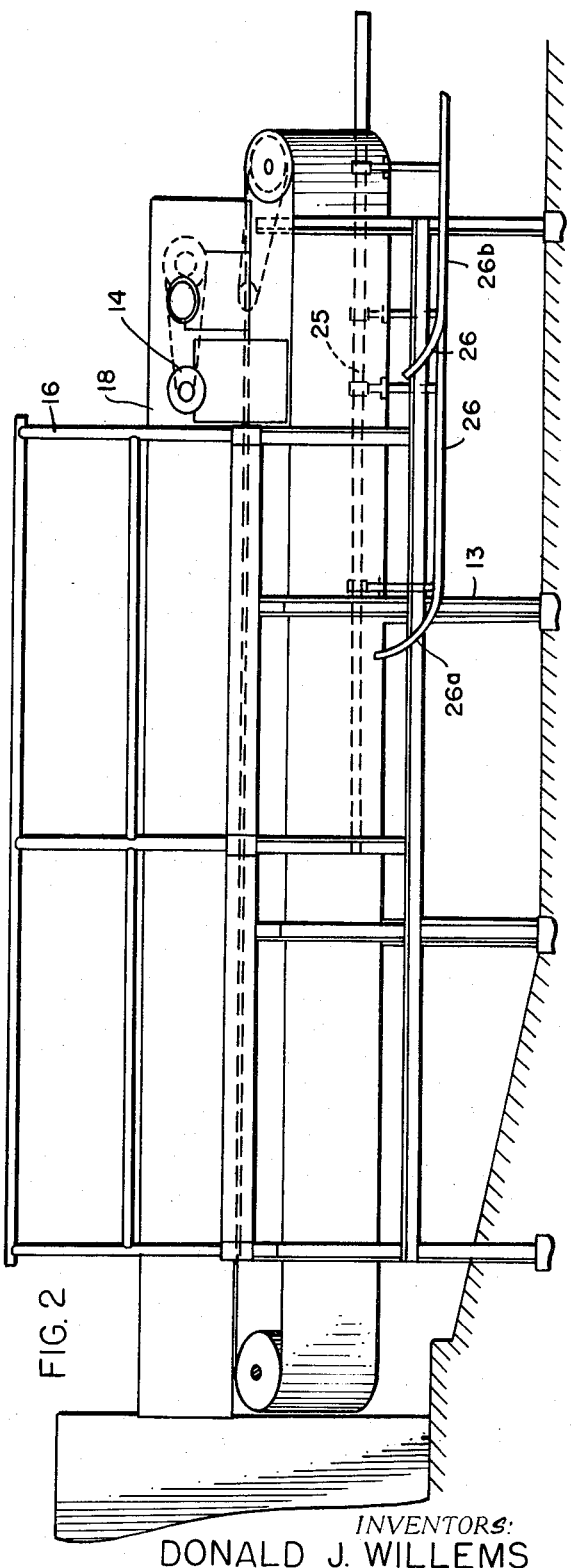

The slide bar 26 is provided at its front with a curved portion 26a, and similarly a slide bar 30 is provided with a tapered forward portion 30a, so that as the chain travels along below the trolley it will be guided onto the tightener 26 or 30, thus giving the operator slack chain during shackling and ease of entry onto the tightener. One or more slide bars 26 or 30 may be provided, each with a tapered front portion and in tandem, as shown in FIG. 2, so that two animals may be on the tighteners and movement of one will not affect the tension on the other.

While we have shown an animal passage provided by a restrainer or restraining pen in which the animal is supported upon its sides with depending legs, the present invention may be used with any ordinary animal passage where the feet of the animal are exposed and attachment chains are suspended from an animal transportation means.

While in the foregoing specification we have set out specific structure in considerable detail for the purpose of illustrating an embodiment of the invention, it will be understood that such details may be varied widely by those skilled in the art without departing from the spirit of out invention.

We claim:

1. In combination with an animal transportation track equipped with a shackle chain, the track being supported alongside a frame providing an animal passage, a tightener below said track inwardly of a shackle chain, and means on said frame supporting said tightener for movement toward said passage and after said shackle chain is attached to an animal's leg for movement through said passage to maintain tension upon said shackle chain.

2. The structure of claim 1 in which said support means comprises spaced spring straps secured at one end to said frame and at the other to said tightener.

3. The structure of claim 1 in which said support means comprises spaced support straps secured to said tightener and pivotally connected to said frame.

4. The structure of claim 1 in which said tightener has its forward end portion inclined inwardly.

5. The structure of claim 1 in which the tightener means comprises a pair of slide bars supported in tandem, each bar having its forward end tapered inwardly.

6. In combination with two spaced-apart conveyor means in a V-forming relationship having their bottom portions spaced apart to provide an open portion therebetween, an animal transporting means extending alongside said conveyor means and adjacent the open portion, said transportation means including depending shackling means adapted for movement along said transportation means and having a length extending to an open portion of said conveyor means, the improvement which comprises a tightener extending longitudinally between said depending shackling means and said open portion and supported for movement toward said open portion when the shackling means is drawn in that direction after attachment to an animal's foot but moving in the opposite direction after said attachment to tension said shackling means.

7. The structure of claim 6 in which said tightener is hingedly supported.

8. The structure of claim 6 in which the spring means normally urges said tightener away from said open portion.

9. The structure of claim 6 in which said tightener has a front inwardly-inclined portion.

10. The structure of claim 6 in which means normally urge said tightener away from said open portion but yield under engagement with said shackling means to allow travel of said shackling means under tension.

* * * * *